(12) United States Patent
Zhou et al.

(10) Patent No.: US 10,466,485 B2
(45) Date of Patent: Nov. 5, 2019

(54) HEAD-MOUNTED APPARATUS, AND METHOD THEREOF FOR GENERATING 3D IMAGE INFORMATION

(71) Applicant: SAMSUNG ELECTRONICS CO., LTD., Suwon-si (KR)

(72) Inventors: Mingcai Zhou, Beijing (CN); Tao Hong, Beijing (CN); Weiming Li, Beijing (CN); Haitao Wang, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/880,020

(22) Filed: Jan. 25, 2018

(65) Prior Publication Data

US 2018/0210208 A1 Jul. 26, 2018

(30) Foreign Application Priority Data

Jan. 25, 2017 (CN) .......................... 2017 1 0056701
Jan. 25, 2017 (CN) ..................... 2017 2 0098252 U

(51) Int. Cl.
| | | |
|---|---|---|
| G02B 27/01 | (2006.01) | |
| G02B 27/10 | (2006.01) | |
| H04N 13/332 | (2018.01) | |
| H04N 13/344 | (2018.01) | |
| H04N 13/307 | (2018.01) | |

(52) U.S. Cl.
CPC ..... *G02B 27/0172* (2013.01); *G02B 27/1026* (2013.01); *H04N 13/307* (2018.05); *H04N 13/332* (2018.05); *H04N 13/344* (2018.05)

(58) Field of Classification Search
CPC ............ G02B 27/0172; G02B 27/1026; H04N 13/307; H04N 13/332; H04N 13/344; G06F 3/011; G06F 3/04815; G09G 3/003
See application file for complete search history.

(56) References Cited

U.S. PATENT DOCUMENTS

| | | | |
|---|---|---|---|
| 2013/0016193 A1* | 1/2013 | Nepveu ................ | G02B 27/017 348/51 |
| 2013/0285885 A1 | 10/2013 | Nowatzyk et al. | |
| 2014/0028667 A1* | 1/2014 | Spruck .................... | G06T 19/20 345/419 |
| 2014/0039309 A1* | 2/2014 | Harris .................. | A61B 5/7282 600/431 |
| 2014/0300869 A1 | 10/2014 | Hirsch et al. | |
| 2016/0277725 A1 | 9/2016 | Ellsworth et al. | |

(Continued)

FOREIGN PATENT DOCUMENTS

KR   10-2016-0093249 A    8/2016

OTHER PUBLICATIONS

Hong Hua and Bahram Javidi, "A 3D integral imaging optical see-through head-mounted display," Opt. Express 22, May 2014.*

(Continued)

*Primary Examiner* — Laurence J Lee
(74) *Attorney, Agent, or Firm* — Sughrue Mion, PLLC

(57) ABSTRACT

Provided is a head-mounted display (HMD) apparatus, including a light modulator and eye lens, where the light modulator is configured to perform integral imaging on an image output from a 2D display panel, to form a light field image, the eye lens are configured to magnify the light field image formed by the light modulator.

18 Claims, 13 Drawing Sheets

(56) References Cited

U.S. PATENT DOCUMENTS

2016/0353098 A1* 12/2016 Stein .................. G02B 27/2264
2017/0010471 A1 1/2017 Serrano Canovas et al.

OTHER PUBLICATIONS

Search Report dated Apr. 30, 2018, issued by the International Searching Authority in counterpart International Application No. PCT/KR2018/001136 (PCT/ISA/210).
Written Opinion dated Apr. 30, 2018, issued by the International Searching Authority in counterpart International Application No. PCT/KR2018/001136 (PCT/ISA/237).

* cited by examiner

HEAD-MOUNTED APPARATUS, AND METHOD THEREOF FOR GENERATING 3D IMAGE INFORMATION

CROSS-REFERENCE TO RELATED APPLICATIONS

This application is based on and claims priority under 35 U.S.C. § 119 to Chinese Patent Application No. 201710056701.0, filed on Jan. 25, 2017 in the State Intellectual Property Office of the People's Republic of China, and Chinese Patent Application No. 201720098252.1, filed on Jan. 25, 2017 in the State Intellectual Property Office of the People's Republic of China, the disclosure of which is incorporated herein by its reference.

BACKGROUND

1. Field

Example embodiments of the present disclosure relate to three-dimensional (3D) display apparatus, in particular to a head-mounted display apparatus, and a method thereof for generating 3D image information.

2. Description of the Related Art

Virtual Reality (VR) technology, being a computer simulation system capable of creating and experiencing virtual world, uses computers to generate a simulated environment and enable a user being immersed into the environment, and the VR technology is a technology capable of supplying interactive-mode 3D dynamic scene of multiple-source information combination and entity behavioral system simulation. In the current VR system, Binocular Stereo Vision (BSV) is a key element for realization of 3D scene. Images, seen by two eyes of a user being different, are generated respectively and displayed on the different display screens; since the images enter the left eye and right eye of a user as required, image parallax can be detected by the user, and thereby depth information of scene could be perceived.

Augmented Reality (AR) is a technology, by which virtual objects can be superimposed in a real scene and virtual information can be applied to a real world, so that the real scene and the virtual objects are superimposed into one image or space in real time and can be viewed by an observer, thereby enabling immersive augmented reality experiences.

A head-mounted display (HMD) is an apparatus configured to display VR and AR. However, in the current technology for HMD depth perception may still be realized by binocular stereoscopic effect, which cannot resolve a tradeoff between eyes focus accommodation and convergence, which may cause fatigue and vertigo to a user after extended-wear, and the resolution of a display may be uniform within the entire view area, and thus resolution of an area that may be viewed by a user's eyes may be the same with that of another area that may not be viewed by a user's eyes, but perception resolution of the area that may be viewed by a user's eyes is not uniform with that of another area that may not viewed by a user's eyes, so the current uniform resolution of a display may not provide the best of visual characteristic according to a user's eyes. In some related technologies, a transmission-type hologram screen is introduced into an HMD apparatus. However, the transmission-type hologram screen may still adopt stereo 3D display or multi-views 3D display, and only partially adopt a holographic element, resulting in a transmission-type hologram screen not capable of providing holographic display and resolving the tradeoff between binocular focusing and convergence, and not capable of providing the best of visual characteristic according to a user's eyes to improve performance and efficiency of an HMD apparatus.

SUMMARY

One or more example embodiments provide an HMD apparatus, and provide a method and device for generating 3D image information.

According to an aspect of an example embodiment, there is provided a head-mounted display (HMD) apparatus including a light modulator configured to perform integral imaging on an image output from a two-dimensional (2D) display panel to form a light field image, and an eye lens configured to magnify the light field image formed by the light modulator.

The HMD apparatus may further include a light screen configured to project a light field image to a left eye and not to a right eye, and project a light field image to a right eye and not to a left eye, wherein the light screen is provided between the light modulator and the eye lens.

The HMD apparatus may further include filtering light rays in view areas other than those in a main view area by an aperture included in the HMD apparatus, wherein the aperture is provided between the light modulator and the eye lens.

The HMD apparatus may further include at least one processor configured to execute processor-executable instructions to acquire parameter information of the HMD apparatus, and generate, based on the parameter information acquired, 3D image information of the HMD apparatus.

The HMD apparatus may further include a first distance adjustment unit configured to adjust distance between an eye lens corresponding to a left eye and an eye lens corresponding to a right eye on the HMD apparatus, to correspond to a distance between a pupil of the left eye and a pupil of the right eye of a user, a second distance adjustment unit configured to adjust distance between an eye lens and the light modulator on the HMD apparatus, to corresponds to an eyesight of the user, a locating unit configured to determine a location of the pupil of the left and right eye of the user with respect to the HMD apparatus, so the location of the pupil of the left eye and the right eye of the user are included within the main view area by adjusting a location of the main view area, and an error storage configured to store an error value corresponding to a parameter information of the HMD apparatus.

The HMD apparatus may further include the 2D display panel configured to output an image, wherein when the 2D display panel is configured with uniform resolution, the light modulator is configured with uniformly distributed dot pitch, and wherein when the 2D display panel is configured with non-uniform resolution, the light modulator is configured with non-uniformly distributed dot pitch.

The light modulator a micro lens array or a pinhole array.

The at least one processor may be further configured to determine the parameter information of the HMD apparatus based on first parameters preset by the HMD apparatus, and acquire the determined parameter information of the HMD apparatus.

The at least one processor may be further configured to determine the parameter information of the HMD apparatus based on third parameters calibrated based on second parameters computed from the first parameters and error values corresponding to the second parameters.

The first parameters may include at least one from among a distance between the 2D display panel and the eye lens, a distance between a virtual 2D display panel and the eye lens, a diameter of the eye lens, a width of the virtual 2D display panel, a number of pixels corresponding to an eye lens, and a pixel pitch of the 2D display panel.

The parameter information of the HMD apparatus may include at least one from among a magnification factor of the 2D display panel, a focal distance of the eye lens, a dot pitch of a virtual light modulator, a distance between the eye lens and a vertex of the main view area, view angle of the main view area, a distance between a virtual 2D display panel and a virtual light modulator, a distance between a light modulator and the eye lens, a distance between the light modulator and the 2D display panel, a magnification factor of the light modulator, and a dot pitch of the light modulator.

According to an aspect of another example embodiment, there is provided a method for generating 3D image information by a head-mounted display (HMD) apparatus, the method may include acquiring parameter information of the HMD apparatus based on first parameters preset by the HMD apparatus, and generating, according to the parameter information acquired, 3D image information of the HMD apparatus; performing integral imaging on an image output from a 2D display panel to form a light field image by a light modulator included in the HMD apparatus; and magnifying the light field image formed by the light modulator by an eye lens included in the HMD apparatus.

The method may further include projecting a light field image to a left eye and not to a right eye, and projecting a light field image to a right eye and not to a left eye by a light screen included in the HMD apparatus, wherein the light screen is provided between the light modulator and the eye lens.

The method may further include an aperture configured to filter light rays in view areas other than those in a main view area, wherein the aperture is provided between the light modulator and the eye lens.

The method may further include adjusting a distance between an eye lens corresponding to a left eye and an eye lens corresponding to a right eye on the HMD apparatus to correspond to a distance between a pupil of the left eye and a pupil of the right eye of a user, adjusting a distance between an eye lens and a light modulator included in the HMD apparatus to correspond to an eyesight of a user, determining a location of the pupil of the left eye and right eye of the user with respect to the HMD apparatus to include the location of the pupil of the left eye and the right eye of the user within the main view area by adjusting a location of the main view area, and storing an error value corresponding to the parameter information of the HMD apparatus.

The method may further include outputting an image by the 2D display panel, wherein when the 2D display panel is configured with uniform resolution, the light modulator is configured with uniformly distributed dot pitch, and wherein when the 2D display panel is configured with non-uniform resolution, the light modulator is configured with non-uniformly distributed dot pitch.

The light modulator may be a micro lens array or a pinhole array.

The acquiring parameter information of the HMD apparatus may include determining the parameter information of the HMD apparatus based on first parameters preset by the HMD apparatus, and acquiring the determined parameter information of the HMD apparatus.

The first parameters may include at least one from among a distance between the 2D display panel and the eye lens, a distance between a virtual 2D display panel and the eye lens, a diameter of the eye lens, a width of the virtual 2D display panel, a number of pixels covered by the eye lens, and a pixel pitch of the 2D display panel.

The parameter information of the HMD apparatus may include at least one from among a magnification factor of the 2D display panel, a focal distance of the eye lens, a dot pitch of a virtual light modulator, a distance between the eye lens and a vertex of the main view area, view angle of the main view area, a distance between a virtual 2D display panel and a virtual light modulator, a distance between the light modulator and the eye lens, a distance between the light modulator and the 2D display panel, a magnification of the light modulator, and dot pitch of the light modulator.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
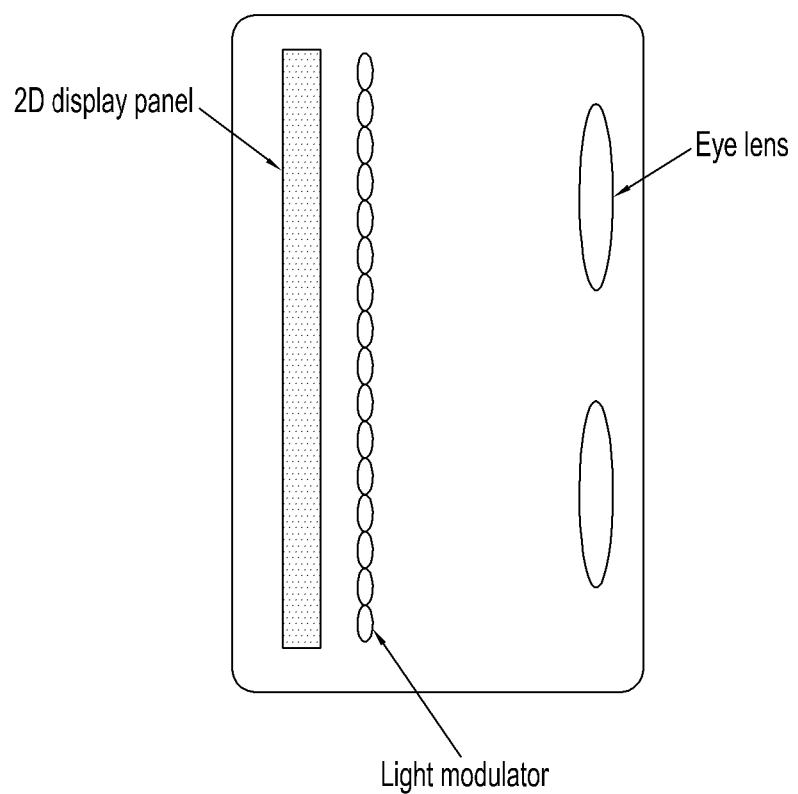
FIG. 1 is a diagram of hardware in an HMD apparatus according to an example embodiment.

Example embodiments of the present disclosure will be described in detail hereinafter. The examples embodiments have been illustrated in the accompanying drawings throughout which same or similar reference numerals refer to same or similar elements or elements having same or similar functions. The example embodiments described with reference to the accompanying drawings are illustrative, merely used for explaining the present disclosure and should not be regarded as any limitations thereto.

It can be understood by those skilled in the art, as used herein, the singular forms "a", "an" and "the" are intended to include the plural forms as well, unless expressly stated otherwise. It will be further understood that the terms such as "comprising" and "including" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The expressions, such as "at least one of" or "at least one from among" when preceding a list of elements, modify the entire list of elements and do not modify the individual elements of the list. For example, "at least one from among a, b, and c," should be understood as including only a, only b, only c, both a and b, both a and c, both b and c, or all of a, b, and c.

It can be understood by those skilled in the art, unless otherwise defined, all terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A head-mounted display apparatus includes a head-mounted display (HMD) configured to operate by magnifying an image on a display screen by a set of optical systems, such as precision optical lens, projecting the image onto a retina in an eye of a user, which allows a larger image to be present in the eyes of the user, to realize different effects, for example, VR, AR and Mixed Reality (MR).

According to an example embodiment, as shown in FIG. 1, an HMD apparatus may include a light modulator and an eye lens. The light modulator may be called as a light modulation unit. The light modulator may be configured to perform integral imaging on an image output from a 2D display panel, to form a light field image, and the eye lenses may be configured to magnify the light field image formed by the light modulator. The HMD apparatus may further include a 2D display panel. In the HMD apparatus, the 2D display panel can have uniform resolution or non-uniform resolution, while the light modulator can have a uniformly distributed dot pitch or a non-uniformly distributed dot pitch.

Figure 2:
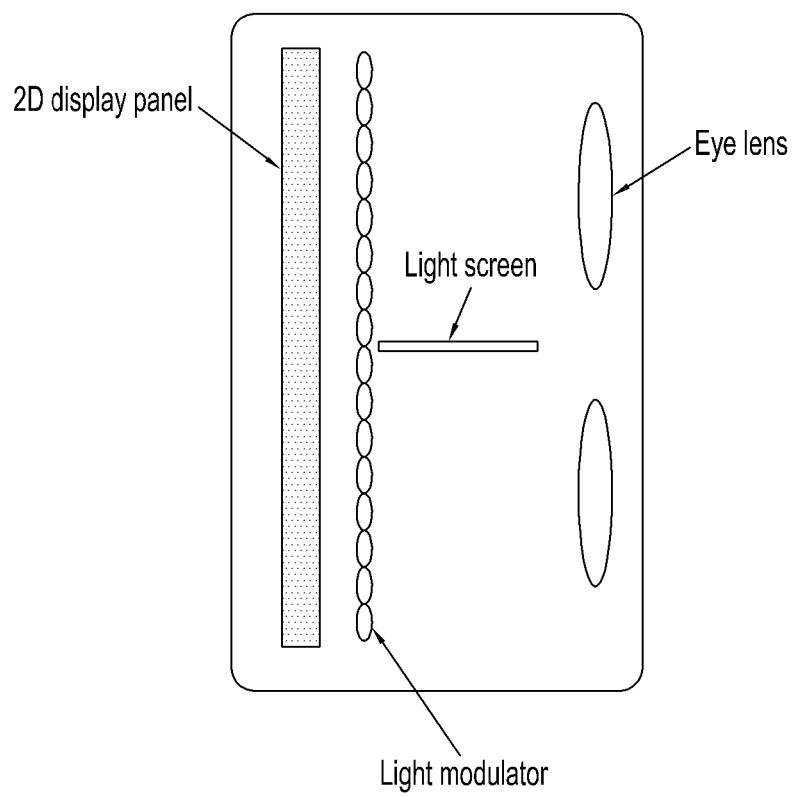
FIG. 2 is a diagram of hardware in an HMD apparatus according to an example embodiment.

According to an example embodiment, as shown in FIG. 2, the HMD apparatus may include a light screen being disposed between a light modulator and an eye lens. The light screen may be configured to enable a light ray expressing a 3D virtual image to be projected according to its predesigned route, to avoid or reduce causing crosstalk during a process of being projected to human eyes. For example, a light field image that should be projected to a left eye is only be projected to the left eye, but not projected to a right eye, and similarly, a light field that should be projected to a right eye is only projected to a right eye, but not projected to a left eye, wherein, the image being projected to human eyes through the light modulator is the light field image. When view areas of human eyes have overlapped areas, which may cause interference to human view and influence display of 3D effect. The light screen enables the overlapped areas that formed on the display panel due to the interference obstructed, the light screen ensures an optimal image quality within the view areas of human eyes. In addition, the light screen is disposed at a right angle to the light modulator, that is, the plane that the light screen locates is at a right angle to the plane that the light modulator locates.

Figure 3:
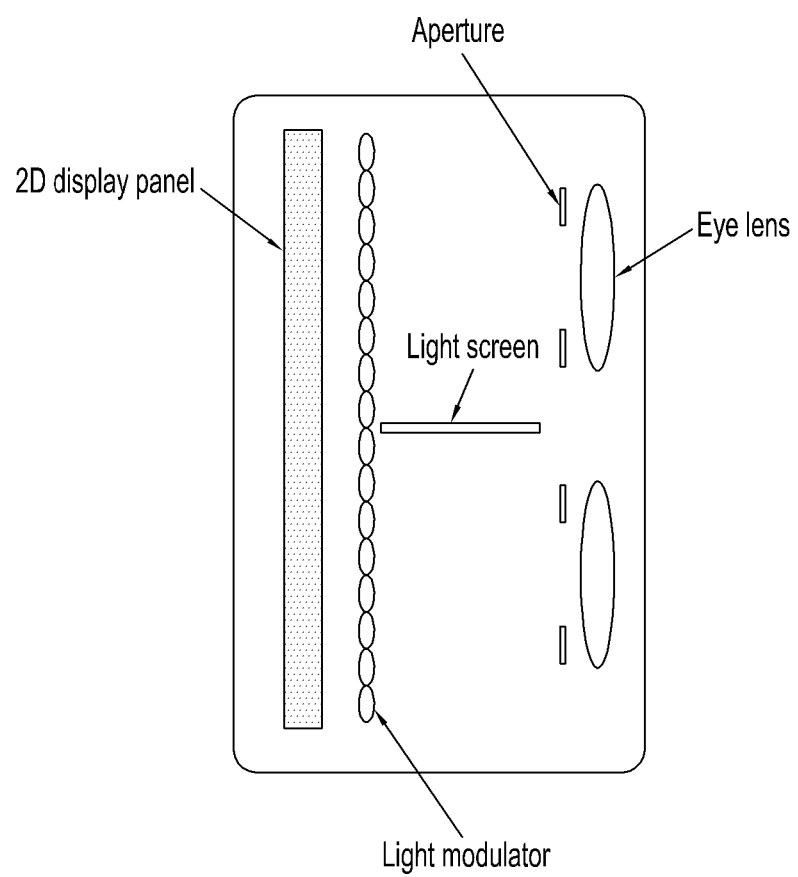
FIG. 3 is a diagram of hardware in an HMD apparatus according to an example embodiment.

According to an example embodiment, as shown in FIG. 3, an aperture may be further included in the HMD apparatus. The aperture may be disposed between a light modulator and the an eye lens, and may be a barrier with a hole arranged by an edge, a frame of an optical element in optical components, or a barrier with a hole specifically arranged in the optical components. The size of the aperture may be decided by a lens frame or other metal frames. The aperture is configured to filter light rays in view areas other than those in a main view area. The main view area may be determined by the 2D display panel and the light modulator together, and the image character in the main view area may include sufficient light rays and clearer images.

Contents displayed by the 2D display panel may be formed as a 3D virtual image by integral imaging after passing through the light modulator. A plurality of view areas in the 3D virtual image, may comprise a main view area and other view areas which are areas not included in the main view area. The main view area may be referred to as a first view area, and the other view area may be referred to as a second view area. If the main view area and the other view areas are not processed by the aperture, interference between the main view area and the other view areas may occur, which may deteriorate the quality of display of the 3D virtual image that ultimately enters into the eye lens and is magnified by the eye lens. The aperture may filter other view areas other than the main view area in the virtual image and only transmit a 3D virtual image within the main view area to the eye lens, thereby ensuring higher quality of display of the 3D image. In addition, the center of the aperture may be aligned with the center of an eye lens.

When installing hardware, the location of the eye lens can be adjusted according to the location of the aperture, or the location of the aperture can be adjusted according to the location of the eye lens, to align the center of the aperture and the center of the eye lens with each other. According to an example embodiment, as shown in FIG. 3, both the aperture and the light screen may be included in the HMD apparatus. The light screen is located between the light modulator and the aperture, to ensure that higher quality 3D virtual image is supplied and unnecessary overlapped areas being viewed by human eyes are avoided or reduced.

According to an example embodiment, the HMD apparatus may further include a distance adjustment unit between eye lenses. The distance adjustment unit between eye lenses may be referred to as a first distance adjustment unit. The first distance adjustment unit is configured to adjust distance between an eye lens corresponding to a left eye and an eye lens corresponding to a right eye in the HMD apparatus, to adapt the adjusted distance between eye lenses to a pupil distance of a user by the first distance adjustment unit. The pupil distance is a distance between both pupils of a user. The first distance adjustment unit between eye lenses can automatically recognize a left eye and a right eye of a user, and adjusts, according to the recognized result, distance between an eye lens corresponding to a left eye and an eye lens corresponding to a right eye in the HMD apparatus. At this time, the eye lens corresponding to the left eye can be called a left eye lens, and the eye lens corresponding to the right eye can be called a right eye lens.

According to an example embodiment, the HMD apparatus may include a distance adjustment unit between an eye lens and a light modulator. The distance adjustment unit between an eye lens and a light modulator may be referred to as a second distance adjustment unit. The second distance adjustment unit may be configured to adjust distance between an eye lens and a light modulator in the HMD apparatus, to adapt the adjusted distance between the eye lens and the light modulator to correspond to an eyesight of a user by the second distance adjustment unit.

According to an example embodiment, the HMD apparatus may include a locating unit, which may be configured to determine a relative location of a pupil in human eyes with respect to the HMD apparatus, to locate the pupil of human eyes in a main view area by adjusting a location of a main view area.

Figure 4:
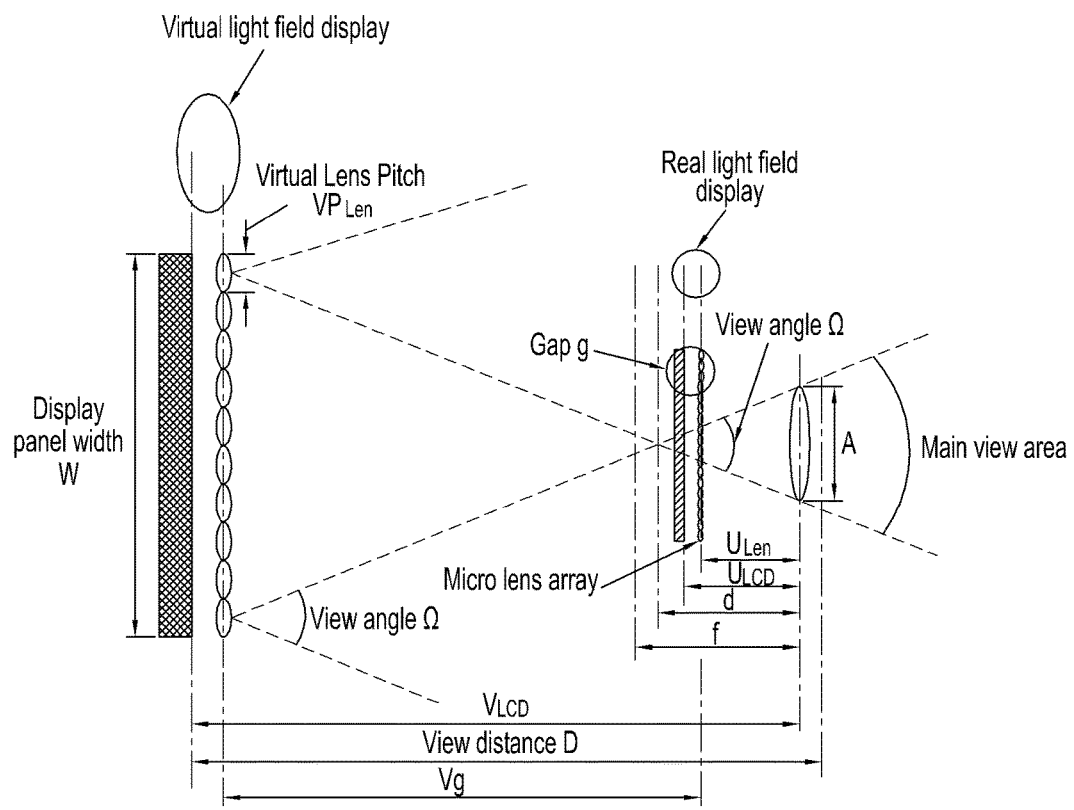
FIG. 4 is a diagram of parameter design of an HMD apparatus according to an example embodiment.
Figure 5:
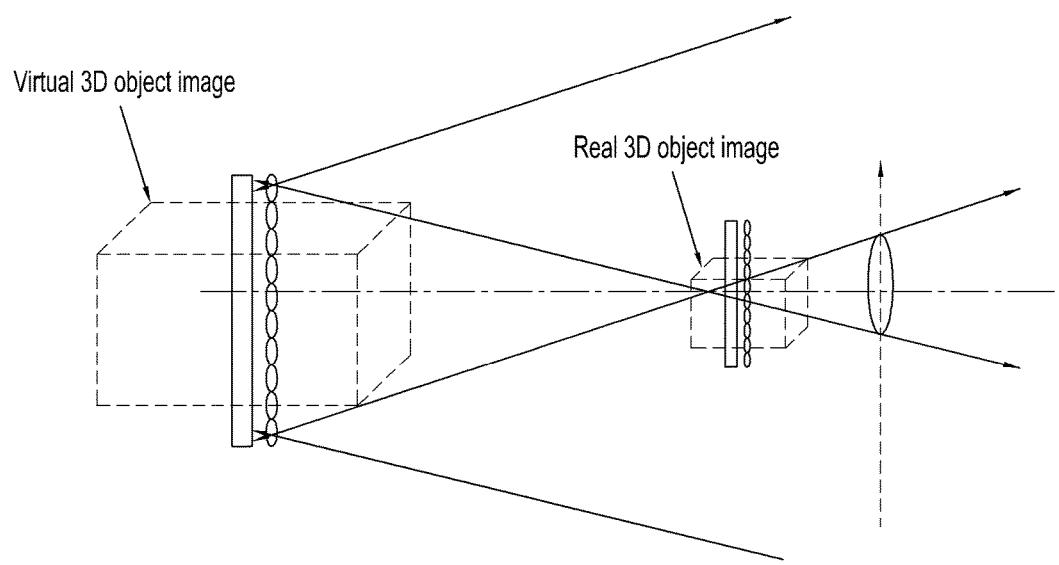
FIG. 5 is a diagram of displaying a 3D object formed in an HMD apparatus according to an example embodiment.

According to an example embodiment, as shown in FIG. 4, the light modulator in the HMD apparatus may be a micro lens array or a pinhole array. As shown in FIG. 5, to display an integral image, an image displayed on the 2D display panel is imaged by a micro lens array and formed as a 3D object light field. By viewing the 3D object light field through eye lenses, human eyes can perceive a real 3D object. Both the micro lens array and the pinhole array may guide a specific-location light ray along a specific direction. The micro lens array and pinhole array can be, for example, a dynamic liquid crystal lens composed of liquid crystal elements or be a liquid crystal pinhole array composed of liquid crystal elements. By controlling liquid crystal elements, micro lens arrays and pinhole arrays of part or whole area may have refraction effects or have no refraction effects. When the micro lens arrays and the pinhole arrays are adjusted so as to have no refraction effects, the light is passed through to implement the switching between a 2D display and a 3D display. Alternatively a display in which a 2D object and a 3D object are mixed, can be implemented.

According to an example embodiment, the HMD apparatus provided may include an error storage. The error storage may be configured to store an error value corresponding to parameter information of the HMD apparatus and the eye lens therein. Optical elements, such as eye lenses in the HMD apparatus, need to reach a certain degree of precision to ensure displaying a higher quality image is implemented;. However, both during a manufacturing process and a using process of an optical element, differences between actual performance parameter and design parameter of the optical element may occur. For example, the difference between temperature in manufacturing an optical element such as an eye lens, and temperature difference in using an eye lens in different environments may result in differences of performance parameter of certain optical elements being caused by thermal expansion-contradiction phenomena based on the different temperatures. When higher-precision is required, such differences may cause largely different over-all properties. An error storage may store these errors, for adjustment and calibration of error.

Figure 6:
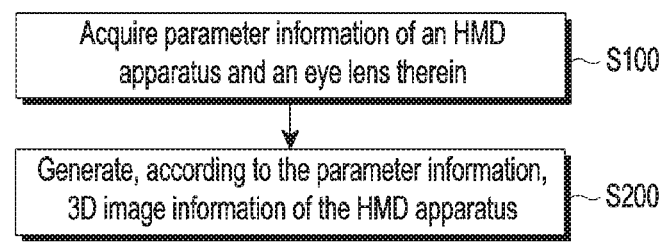
FIG. 6 is a flow chart of a method for generating 3D image information in an HMD apparatus according to an example embodiment.

A method for generating 3D image information is provided according to one example embodiment, as shown in FIG. 6.

A method of generating 3D image information may include acquiring parameter information of an HMD apparatus and eye lenses therein (S100). The parameter information of the HMD apparatus may include parameters of the HMD apparatus itself and parameters of the eye lenses included in the HMD. In addition, the parameter information of the HMD apparatus may include parameters depending on each or a combination of an HMD apparatus, a light modulator, an eye lens, a light screen, and an aperture. Various parameters related to the HMD apparatus, for example, physical magnitude, focal distance, and other parameters of an eye lens, distance between an eye lens and a light modulator, and spatial location of an eye lens, may be determined. The various parameters related to the HMD apparatus may be preset parameters. The preset parameters related to the eye lenses may influence the determination of other relevant parameters.

The parameter information of the HMD apparatus and the eye lenses therein are determined based on preset parameters of the HMD apparatus and the eye lenses therein, where the preset parameters may include distance between a real 2D display panel and an eye lens, distance between a virtual 2D display panel and an eye lens, diameter of an eye lens, width of a virtual 2D display panel, number of pixels covered by one eye lens and pixel pitch of a 2D display panel. However, example embodiments are not limited thereto.

The parameter information of the HMD apparatus and eye lenses therein determined by preset parameters may include at least one from among magnification(magnifying power) of a 2D display panel, focal distance of an eye lens, dot pitch of a virtual light modulator, distance between an eye lens and a vertex of a main view area, view angle of a main view area, distance between a virtual 2D display panel and a virtual light modulator, distance between a real light modulator and an eye lens, distance between a real light modulator and a real 2D display panel, and magnification of a light modulator, and dot pitch of a real light modulator.

For example, as shown in FIG. 4, the preset parameters may include distance between a real 2D display panel and an eye lens $U_{LCD}$, distance between a virtual 2D display panel and an eye lens $V_{LCD}$, diameter of an eye lens A, width of the virtual 2D display panel W, number of pixels covered by one lens on one micro lens array N, and pixel pitch of the 2D display panel is $P_{LCD}$.

The parameter information of an HMD apparatus and eye lenses therein may be computed by the equations below.

A magnification factor M of a 2D display panel is calculated according to equation (3) below:

$$M = V_{LCD}/U_{LCD} \quad (1)$$

A focal distance f of an eye lens is calculated according to equation (2) below.

$$\frac{1}{U_{LCD}} - \frac{1}{V_{LCD}} = \frac{1}{f} \quad (2)$$

A dot pitch $VP_{Len}$ of a virtual light modulator is calculated according to equation (3) below.

$$VP_{Len} = N * P_{LCD} * M \quad (3)$$

A distance d between an eye lens and a vertex of a main view area, between a vertex of an eye lens and a vertex of a main viewing area, where the primary viewing field forms a taper field, that is, the vertex of the primary viewing field is the vertex of the taper field, is calculated by equation (4) below.

$$d = A*V_{LCD}/(A+W) \quad (4)$$

The main view area forms a conical area, where the vertex of the main view area is the top of the conical area. A view angle $\Omega$ of a main view area is calculated by equation (5) below.

$$\Omega = 2a\,\tan(A/(2d)) \quad (5)$$

A distance $V_g$ between a virtual 2D display panel and a real 2D display panel is calculated by equation (6) below.

$$V_g = VP_{Len}/(2*\tan(\Omega/2)) \quad (6)$$

A distance $U_{Len}$ between a real light modulator and an eye lens is calculated by equation (7) below.

$$\frac{1}{U_{Len}} - \frac{1}{V_{LCD} - V_g} = \frac{1}{f} \quad (7)$$

A distance g between the real light modulator and a real 2D display panel is calculated by equation (8) below.

$$g = U_{LCD} - U_{Len} \quad (8)$$

A magnification K of the real light modulator is calculated by equation (9) below.

$$K = V_{Len}/U_{Len} \quad (9)$$

A dot pitch of the real light modulator $P_{Len}$ is calculated by equation (1) below.

$$P_{Len} = VP_{Len}/K \quad (10)$$

A real light field display may be composed of a real 2D display panel and a light modulator, a virtual light field display corresponding to the real light field display may be composed of a virtual 2D display panel and a virtual light modulator. The parameter information of the HMD apparatus may be calibrated based on the computed parameter information of an HMD apparatus and eye lenses therein in combination with a corresponding error value of the parameter information, to adapt the HMD apparatus to use the parameters of real apparatus and maintain a higher quality performance. The preset parameters of the HMD apparatus may be first parameters, the computed parameters of the HMD apparatus may be second parameters, and the calibrated parameters of the HMD apparatus may be third parameters.

The first parameters are preset based on the characteristics of the HMD apparatus itself, the second parameters are computed from the first parameters by an arithmetic operation, and the third parameters corresponding to the second parameters are calibrated by reflecting the error value.

According to an example embodiment, the method for generating 3D image information may include generating 3D image information of the HMD apparatus based on the parameter information of the HMD apparatus, for example, the first parameters, the second parameters, and the third parameters (S200).

Figure 7:
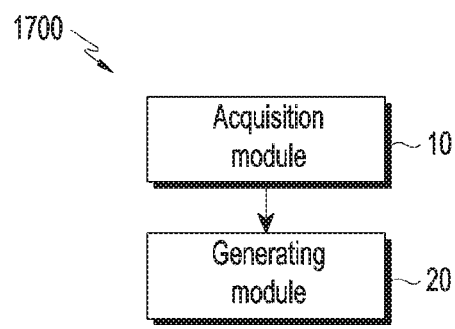
FIG. 7 is a diagram of a device for generating 3D image information in an HMD apparatus according to an example embodiment.
Figure 17:
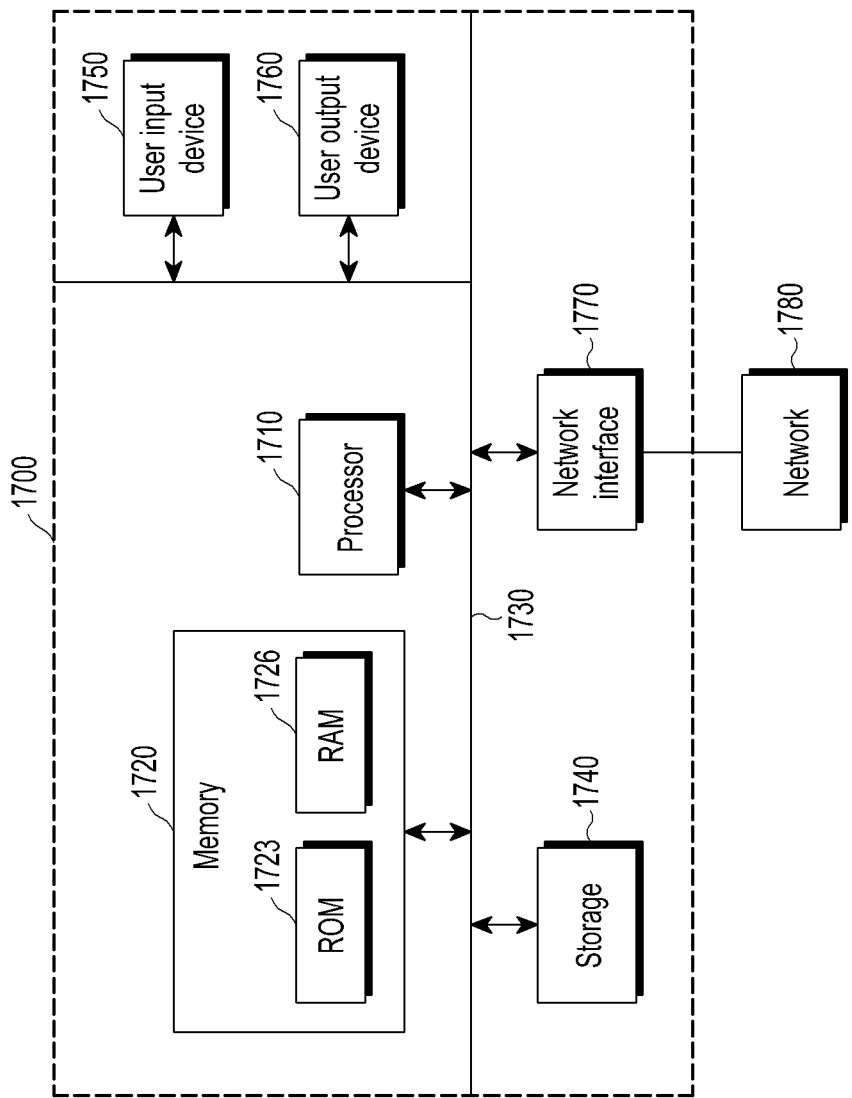
FIG. 17 is an example diagram illustrating a configuration of a computer system for implementing a method for generating 3D image information according to an example embodiment.

An apparatus for generating 3D image information corresponding to the method described-above for generating 3D image information may include a computer system 1700 as shown in FIG. 7, which may include an acquisition module 10 configured to acquire parameter information of an HMD apparatus and eye lenses therein, and a generating module 20 configured to generate, according to the parameter information, 3D image information of the HMD apparatus. The acquisition module 10 and the generating module 20 may be included in the at least one processor 1710 as illustrated in FIG. 17.

According to an example embodiment, an HMD apparatus may have uniform resolution, as shown in FIG. 3. The HMD apparatus may include at least one from among a 2D display panel with uniform resolution, a micro lens array with a uniformly distributed dot pitch, an aperture, or eye lenses.

The 2D display panel can be one display panel including two display areas, and each of two display area may display the image that enters into a left eye of a user or the image that enters into a right eye of a user. However, example embodiments are not limited thereto, and the 2D display panel may include two separate display panels. One of the two panels may display the image that enters into the left-eye of a user and the other of the two panels may display the image that enters into the right-eye of a user, respectively. The display panel can be fixedly installed on an HMD apparatus, that is, the HMD apparatus may be integrated with all structure-function units into one apparatus, without other independent devices. However, example embodiments are not limited thereto. The display panel can be a display screen of separate devices, for example, mobile phone, tablet computer or the like. That is, one or more dependent mobile device may be used in combination with a different structure-function units other than all structure-function units above-described. Accordingly, when the display panel may be a display screen of other apparatus, the apparatus may include at least one from among a support unit for placement of the other apparatus, a micro lens array with a uniformly distributed dot pitch, a aperture, and an eye lens. The 2D display panel in the HMD apparatus can also be implemented by a separate computer, and the image obtained by computation may be transmitted to the 2D display panel wired or wirelessly.

In an example embodiment, after passing through the micro lens array (light modulator), contents displayed by the 2D display panel form integral imaging display, and the micro lens array processes the contents displayed by the 2D display panel as a virtual object light field. There are a plurality of view areas in the virtual object light field transmitted out of the micro lens array. If processed without the micro lens array, there may be interference between a main view area and other view areas. In an example embodiment, an aperture may filter view areas other than the main view area, of the virtual object light field, and may transmit the main view area of the virtual object light field to the eye lens. The eye lens may then magnify the main view area of the virtual object light field, and then may transmit the magnified main view area of the virtual object light field to the eyes of the user, to avoid or reduce interference occurred by other view areas with respect to the main view area by the aperture, which may improve the quality of displaying an image.

The aperture may allow light rays of the main view area to pass through while blocking light rays in other view areas other than the main view area from passing, to eliminate or reduce interference, and provide a user with 3D display contents of improved quality. When there is no aperture, light rays entering into a pupil of an eye may come from two adjacent view areas rather than one view area, which may lead to appearance of image defect such as a ghost image of the object. Accordingly, the shape of the aperture should be matched with the shape of the main view area. In an example embodiment, the location and size of the aperture can be determined by the location and size of the main view area, and the center of the aperture may be adjusted to be located at the center of an eye lens. According to an example embodiment, the HMD apparatus may include a second location unit configured to adjust relative location of the aperture and the eye lens. In an example embodiment, based on an inclusion of an eye lens, the shape of a main view area may correspond to a main view area of a virtual light field display (a real light field display is composed of a 2D display panel and a light modulator) obtained after magnification of the main view area of a real light field display by the eye lens.

Figure 8:
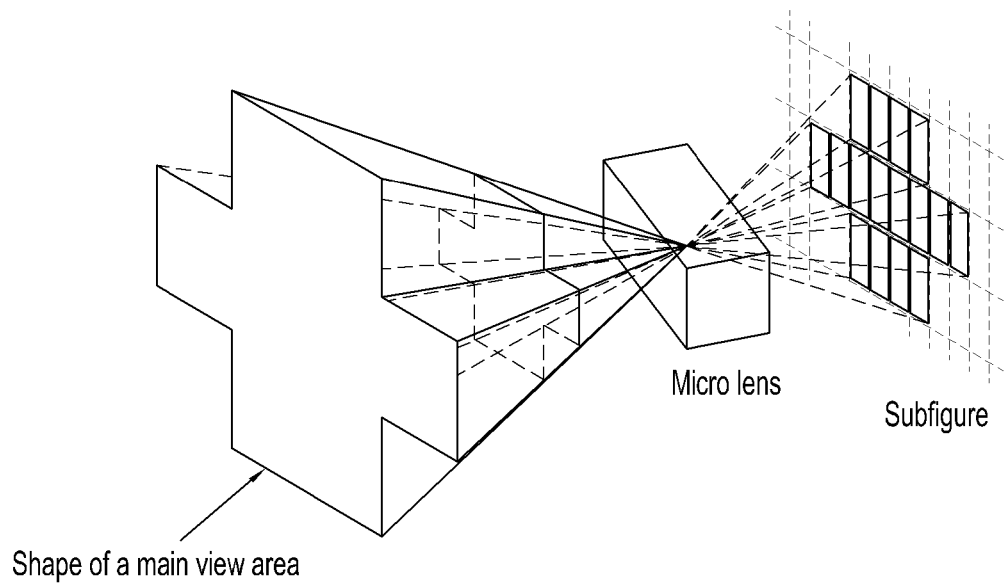
FIG. 8 is a diagram of a shape of a view area and a shape of a corresponding subfigure covered by a micro lens array according to an example embodiment.
Figure 9:
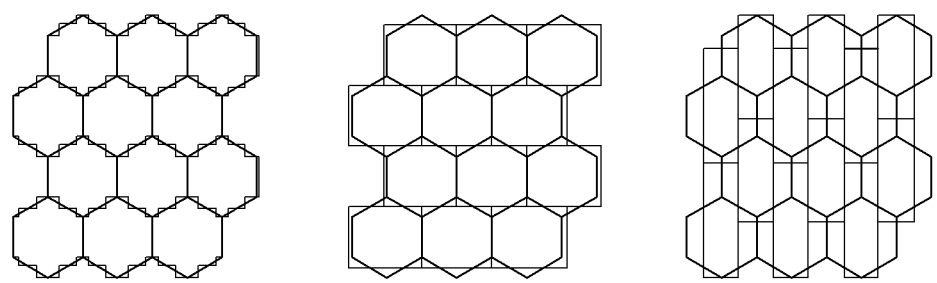
FIG. 9 is a diagram of example shapes of subfigures under one micro lens array according to an example embodiment.

A shape of a view area may be determined by a shape of a subfigure covered by a micro lens array. As shown in FIG. 8, the shape of the view area may correspond to the shape of the subfigure magnified by the micro lens, but the location of the view area is at the opposite side with respect to the micro lens. Two adjacent subfigures may form two adjacent view areas, and a view area formed by a subfigure directly below the micro lens may be a main view area. For a designated micro lens array, as shown in FIG. 9, there may be a plurality of subfigure arrangement modes. Different subfigure arrangement modes may form different shapes of main view areas for being applicable to different application programs. The type of shape of main view area is to be used is determined according to requirement of different programs. For example, the shape of the subfigure in the middle in FIG. 9 may be applicable to an application program requiring a larger active region in a horizontal direction, and the subfigure on the left in FIG. 9 may form a sub-circular main view area, because the shape of a pupil of human eyes is circular, and the arrangement modes of the subfigure may be used for the application program according to an example embodiment for an HMD. The shape of the subfigure on the right in FIG. 9 may be applicable to an application program requiring a larger active region in a vertical direction.

When view range of a user's eyes has areas that overlap on a display panel, the overlapped areas may cause interference to a user's view and influence the displaying of the 3D effect. Accordingly, in an example embodiment, the HMD apparatus may further include a light screen. As shown in FIG. 3, the light screen may be located between a micro lens array and an aperture, and the light screen may be configured to ensure that there is no overlapped areas of view areas of the user's eyes in a display panel. The light screen may be at a near or equal to a right angle to the plane where the aperture is located. By arranging a light screen and preventing or reducing any overlapped areas of view areas of eyes in a display panel, display quality of the HMD apparatus may be improved.

As a pupil distance of users may be different, in order to improve user adaption of the apparatus, the HMD apparatus of an example embodiment can further include a distance adjustment unit between the eye lenses, being configured to adjust distance between an eye lens corresponding to a left eye and an eye lens corresponding to a right eye in the HMD apparatus. The distance adjustment unit between eye lenses may be a first distance adjustment unit. The distance adjustment unit between eye lenses can perform adjustment on distance between an eye lens corresponding to a left eye and an eye lens corresponding to a right eye on an HMD apparatus according to an operation of a user. The distance adjustment unit between eye lenses can further automatically recognize a left eye and a right eye of a user, and according to the recognized result, adjust the distance between an eye lens corresponding to a left eye and an eye lens corresponding to a right eye on an HMD apparatus. As the pupil distance of different users may be different the HMD apparatus including the distance adjustment unit between eye lenses can adjust eye lens-distance according to distance between a left eye and a right eye of a user, so the distance between eye lenses corresponds to a pupil distance of a user, thereby adaptively improving a user's experience.

Moreover, different users may have different eyesight, for example, users may wear nearsightedness glasses or farsightedness glasses. The HMD apparatus may further include a distance adjustment unit between an eye lens and a light modulator, configured to adjust distance between an eye lens and a micro lens array on the HMD apparatus. The distance adjustment unit between an eye lens and a light modulator may be a second distance adjustment unit. With the distance adjustment unit between an eye lens and a micro lens array, distance between an eye lens and a micro lens array on the HMD apparatus can be adjusted according to eyesight of a user, to adapt users with different eyesight, thereby improving user experience for users with different eyesight.

A method for generating 3D image information in an HMD apparatus may be performed according to parameters among a 2D display panel, a micro lens array, an aperture and an eye lens.

A storage of an HMD apparatus may store the following preset parameters including: a distance between a real 2D display panel and an eye lens $U_{LCD}$, a distance between a virtual 2D display panel and an eye lens $V_{LCD}$, diameter of an eye lens A, a width of a virtual 2D display panel W, a number of pixels covered by one lens N, and a pixel pitch of a 2D display panel $P_{LCD}$.

Additionally, the HMD apparatus may include at least one parameter from among physical magnitude, focal distance and other parameters of an eye lens, distance between an eye lens and a light modulator, and spatial location of an eye lens. The preset parameters of the eye lenses may influence determination of other parameters. The preset parameters are determined by the HMD apparatus itself. The parameter related to various optical elements that may be included in the HMD apparatus may be preset.

Based on the above preset parameter, parameters such as dot pitch of a real micro lens array and distance between a real micro lens array and a real 2D display panel, can be computed according to the above questions and following steps. The computed parameters may be a second parameters. The second parameters may include at least one from among magnification of a 2D display panel, focal distance of eye lens, dot pitch of a virtual micro lens array, distance between an eye lens and a vertex of a main view area, view angle of a main view area, distance between a virtual 2D display panel and a virtual micro lens array, distance between a real micro lens array and an eye lens, distance between a real micro lens array and a real 2D display panel, and magnification and dot pitch of a real micro lens array.

After obtaining the second parameters, the entire optic parameter of a whole HMD apparatus may be determined by computing the magnification $M=V_{LCD}/U_{LCD}$ of a 2D display panel, and computing a focal distance f of an eye lens according to equation (1) and equation (2) (Step 1). A dot pitch $VP_{Len}=N*P_{LCD}*M$ of a virtual micro lens array may then be calculated according to equation (3) (Step 2). A distance $d=A*V_{LCD}/(A+W)$ between an eye lens and a vertex of a main view area may be calculated according to equation (4) (Step 3), and a visual angle $\Omega=2a\tan(A/(2d))$ of a main view area may be calculated according to equation (5) (Step 4). A distance $V_g=VP_{Len}/(2*\tan(\Omega/2))$ between a virtual 2D display panel and a virtual micro lens array is calculated according to equation (6) (Step 5), and a distance $U_{Len}$ between a real micro lens array and an eye lens is calculated according to equation (7) (Step 6). A distance $g=U_{LCD}-U_{Len}$ between a real micro lens array and a real 2D display panel is calculated according to equation (8) (Step 7), a magnification $K=V_{Len}/U_{Len}$ of a real micro lens array is calculated according to equation (9) (Step 8), and a dot pitch $P_{Len}=VP_{Len}/K$ of a real micro lens array is calculated according to equation (10) (Step 9).

In an example embodiment, as shown in FIG. 8, a 2D display panel area below a micro lens is formed by arrangement of three rows of sub-pixel dot groups, where the sub-pixel dot groups related to the micro lens is denoted by a shadow, and distribution shapes of these sub-pixel dot groups are shown in FIG. 8. The shape of a main view area obtained by being transmitted out of a micro lens array is identical with those of sub-pixel arrangement. The location of a vertex of the main view area is based on a parameter obtained by computing preset parameters, and the size of a center depth section of the main view area is the size of a section of the main view area and the lens plane of an eye lens.

In an example embodiment, based on the eye lenses, parameters of a virtual light field display may be calculated or stored in a storage after pre-calculation, then according to the position of a head, the position of the virtual light field display relative to a center of a head may be computed by considering a head center as an origin point, and then content may be generated.

Figure 10:
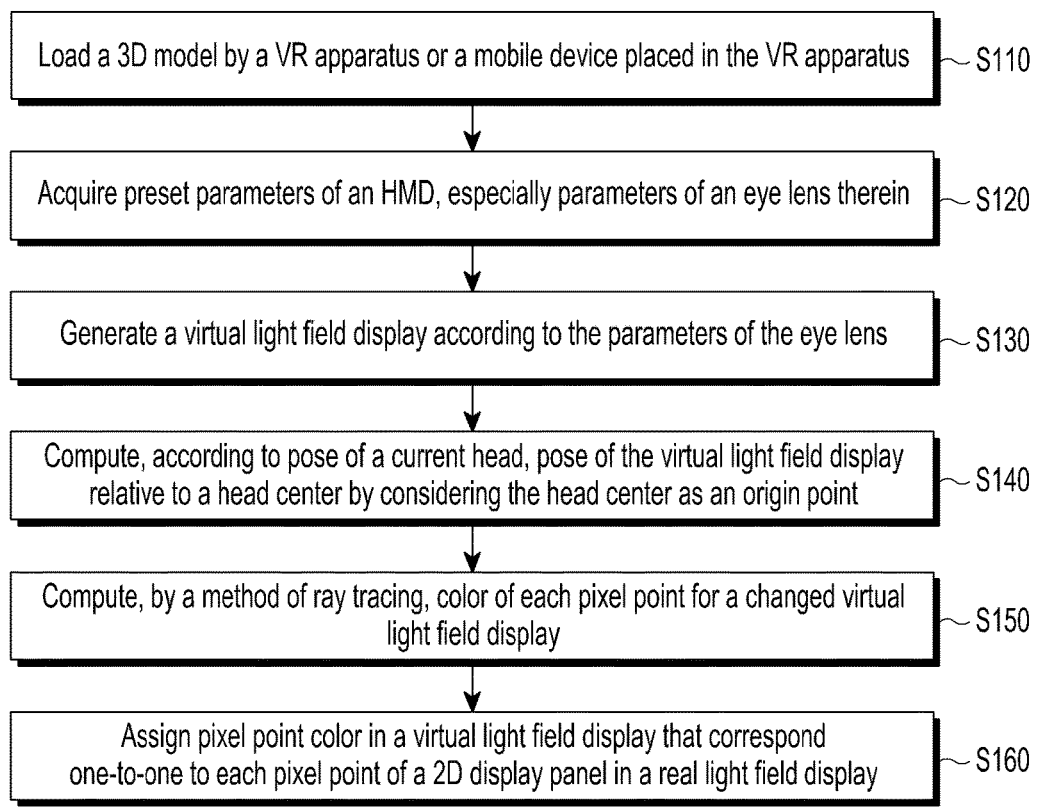
FIG. 10 is a flow chart of a method for generating 3D image information in an HMD apparatus according to an example embodiment.

As shown in FIG. 10, a method for generating contents of an example embodiment includes loading a 3D model by a VR apparatus or a mobile device placed into a VR apparatus (S110). The 3D model can be various 3D model formats, for example, a 3D mesh, a 3D voxel or other model formats, and the mobile device can be, for example, a mobile phone, a tablet computer or other portable devices.

After the 3D model is loaded, preset parameters of an HMD, including parameters of the eye lenses may be acquired (S120). The acquired preset parameters can include $U_{LCD}$, $V_{LCD}$, W, N and $P_{LCD}$. The preset parameters can be provided by a manufacturer, and stored in a storage of an apparatus, and read by a light field image rendering software.

Then a virtual light field display according to eye lenses parameters may be generated according to Step 2 and Step 5 of the above computation process.

According to the position of a current head, the position of the virtual light field display relative to a head center by considering the head center as an origin point may be computed (S140). Head position parameters may include direction and location of a head in a 3D space, which can be read from a head shape measuring unit. Location of the virtual light field display relative a head center may be determined by mechanical structure design parameters of the apparatus, such as, a distance between an eye lens and an eye, and pupil distance between eye lenses, and eye lenses parameters, which can also be read from a storage of an apparatus.

By ray tracing, color of each pixel point for a changed virtual light field display and for the virtual light field display, may be computed according to preset parameters read from a storage unit of the apparatus, the parameters being parameters of light rays in the space corresponding to each pixel point of a display(S150). For example, for one pixel point, the corresponding light ray thereof can be determined by a point-to-point line where one point is a location of a pixel itself in a display and another point is a location of an optical center of a micro lens corresponding to the pixel. Location of the pixel may be determined by location of a display panel and location of a pixel in an image, and an optical center of a micro lens may be determined by preset parameters of the apparatus, and the location of the display panel and the micro lens can be read from a storage of the apparatus. Then the color value of the pixel by using a method of ray tracing may be computed.

Then pixel point color in a virtual light field display may be assigned one-to-one to each corresponding pixel point of a 2D display panel in a real light field display (S160). When all the pixel points on the 2D display panel in the real light field display are assigned with corresponding pixel point color values, generation of 3D image information may be implemented by the head-mounted apparatus, and the 3D image information can be displayed therein.

Figure 11:
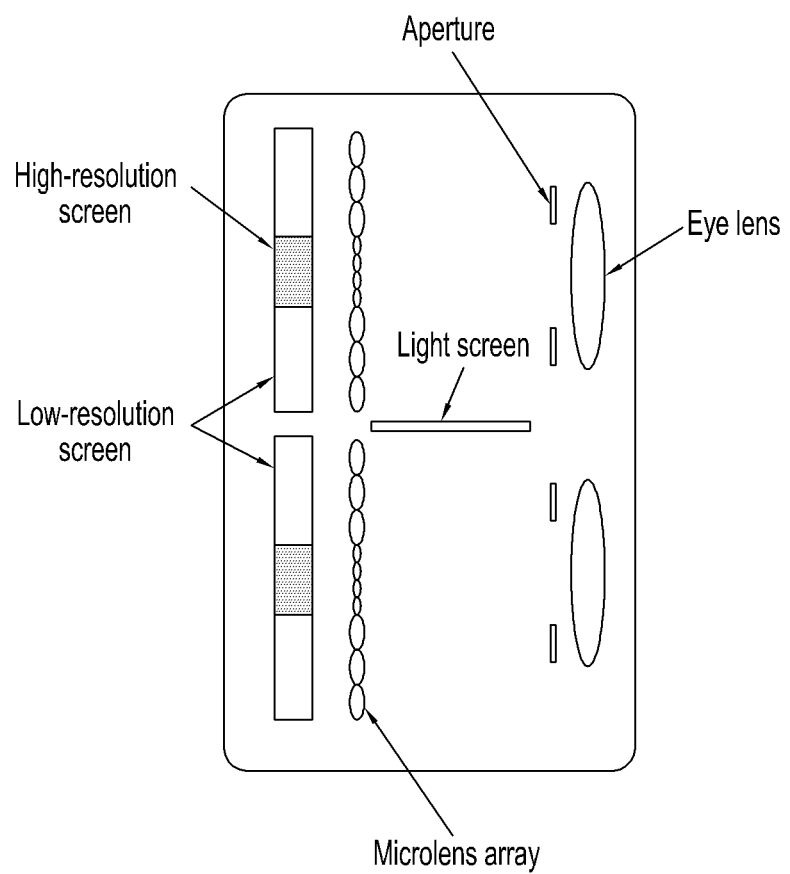
FIG. 11 is a diagram of hardware in an HMD apparatus according to an example embodiment.

According to an example embodiment, an HMD apparatus with non-uniform resolution may be provided, as shown in FIG. 11. The HMD apparatus may include at least one from among a 2D display panel with non-uniform resolution, a micro lens array with non-uniformly distributed dot pitch, an aperture, and eye lenses.

As a 2D display unit, the 2D display panel can be one display panel including two display areas, and each of two display area may display the image that enters into a left-eye of a user or the image that enters into a right-eye of a user. However, example embodiments are not limited thereto, and the 2D display panel can comprise two separate display panels. One of two panels may display the image that enters into a left-eye of a user and the other of the two panels may display the image that enters into a right-eye of a user, respectively. The display panel can be fixedly installed on an HMD apparatus, that is, the HMD apparatus is integrated with all structure-function units into one apparatus, without other independent devices. Or, the display panel can be a display screen of other devices, for example, mobile phone, tablet computer or the like, that is, one or more dependent mobile apparatus may be used in combination with different structure-function units in the HMD other than all structure-function units above-described. Accordingly, when the display panel is a display screen of other apparatus, the apparatus may include at least one from among a support unit for placement of the other apparatus, a micro lens array with non-uniformly distributed dot pitch, an aperture and an eye lens. The 2D display panel in the HMD apparatus can also be implemented by a separate computer, and an image obtained by computation may be transmitted to the 2D display panel via wired or wirelessly.

Figure 12:
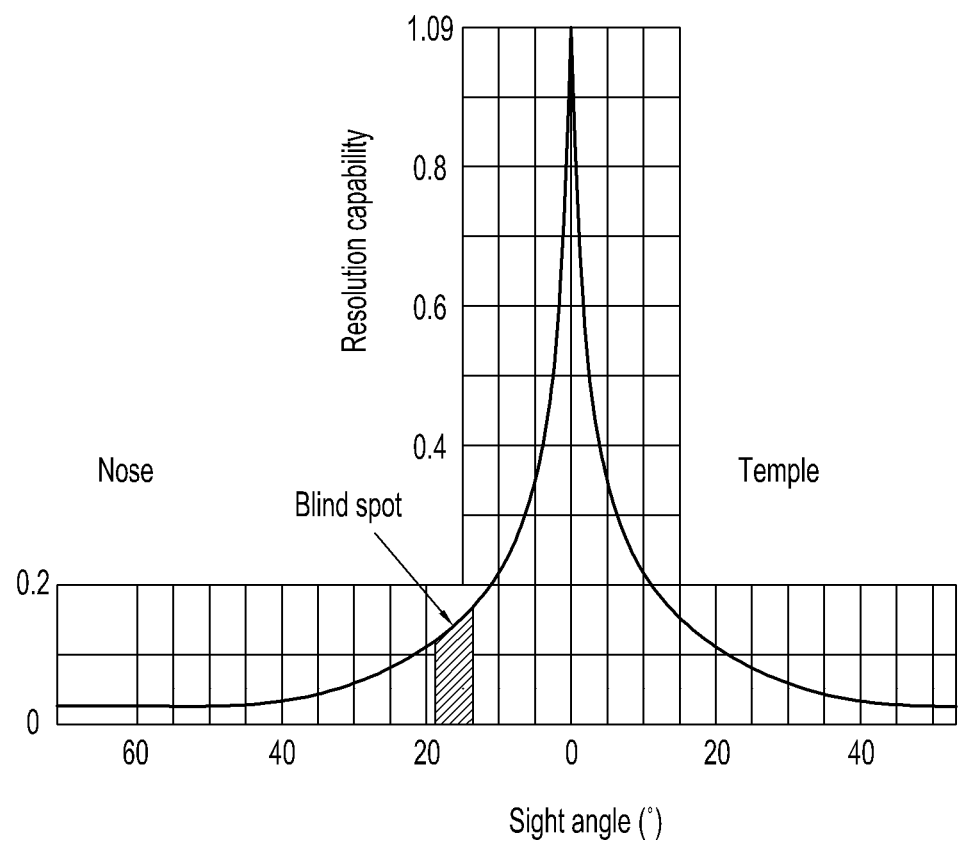
FIG. 12 is a graph showing resolution of human eyes based on view angles according to an example embodiment.

In an example embodiment, resolution of a 2D display panel may be non-uniform, and the structure may be improved by performing device structure arrangement according to human eyes bionics. FIG. 12 illustrating a relation between resolution of human eye and a view angle of human eye shows that human eyes' retinas have different resolution viewing capability for different view angles, and as the view angle decreases, the resolution the human eyes retinas is capable of viewing increases, and when the viewing angle is near zero, resolution capability of the human retinas may be the highest. When the viewing angle is over about 5 degree, the resolution capability of the human eyes decreases sharply, for example, at a location that is 12 degree from the center, resolution capability of a human eye decreases to about one fifth of resolution at the center where the viewing angle is near zero that is near a blind spot. Accordingly, by utilization of feature of non-uniform distribution of resolution capability of human eye, specific designing can be performed on a related element in an HMD apparatus, using higher resolution near the center location of a 2D display apparatus, while lower resolution may be used near the edge of the 2D display apparatus, which may allow the human eyes not only to view high-resolution 3D image but also view a scene around the center. According to this example design, utilization of a high-resolution 2D display panel may be increased or maximized, while computation amount can also be decreased, thereby reducing manufacturing cost of an apparatus. Meanwhile, a dot matrix of a micro lens array may be non-uniformly distributed, which may be adapted with a 2D display panel for non-uniform displaying, and this display mode is adapted with eyesight of human eyes, and can further improve visual experience of a user.

Figure 13:
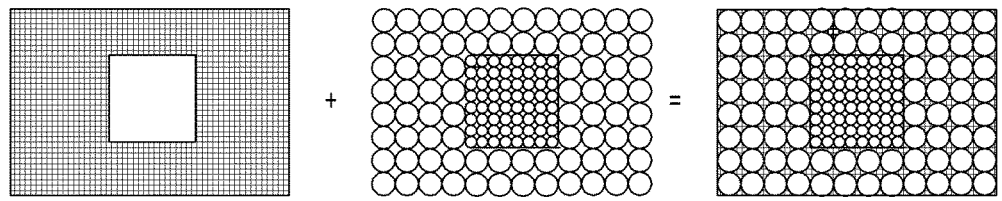
FIG. 13 is an example light field display with non-uniform resolution composed of a 2D display panel with non-uniform resolution and a micro lens array according to an example embodiment.

As shown in FIG. 13, a light field display with non-uniform resolution may include a 2D display panel with non-uniform resolution and a micro lens array with non-uniform resolution. A high-resolution 2D panel may correspond to a high-density micro lens array, and a low-resolution 2D display panel may correspond to a low-density micro lens array. This design may improve resolution in a high-density micro lens array area space, while maintaining resolution in a low-density micro lens array area space.

In an example embodiment, the HMD apparatus may further include at least one from among a light screen, eye lenses-distance adjustment unit, a distance adjustment unit between an eye lens and a light modulator, and the operating principle and location structure.

Figure 14:
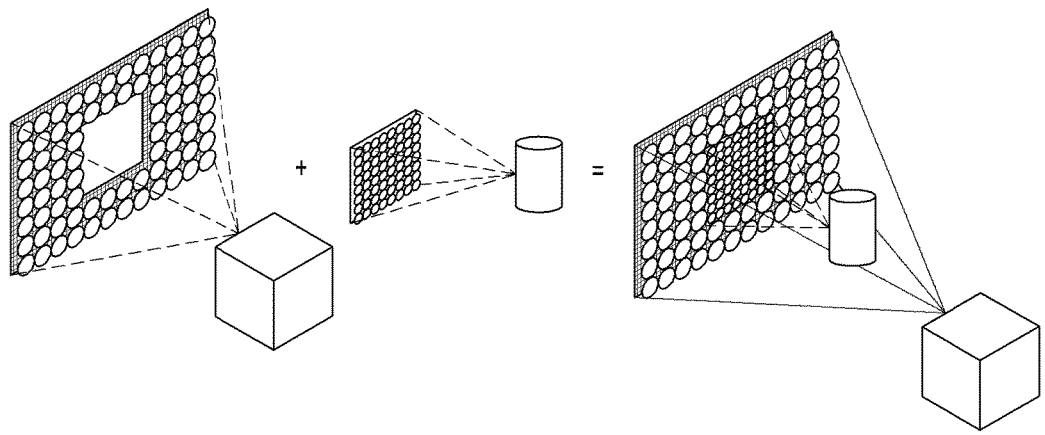
FIG. 14 is a diagram of generating 3D image information of a light field display with non-uniform resolution according to an example embodiment.

An example method of generating 3D image information of a light field display with non-uniform resolution is shown in FIG. 14. Due to only different optical parameters being between a low-density micro lens array and a high-density micro lens array, when generating 3D image information, each optical parameters may be used to generate corresponding 3D image information. Generating can be performed separately, and then subfigures may be combined.

Figure 15:
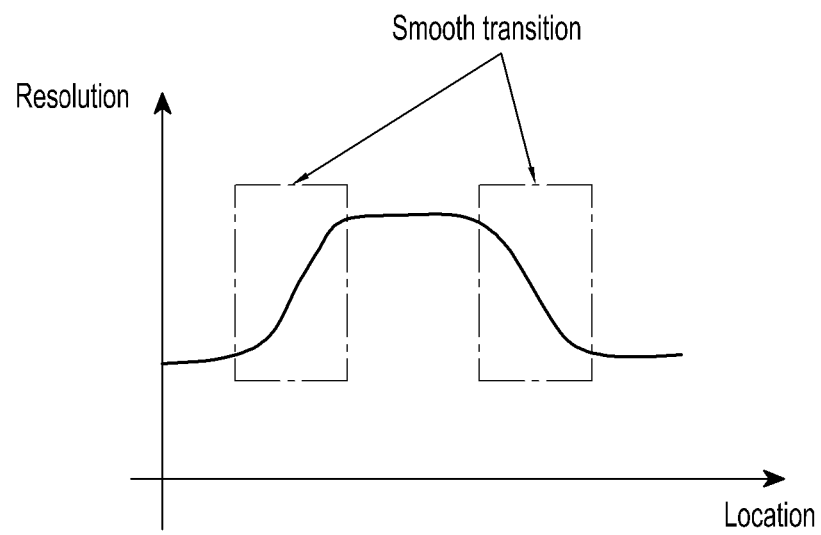
FIG. 15 is a graph of the resolution smooth transition of a light field display with non-uniform resolution according to an example embodiment.
Figure 16:
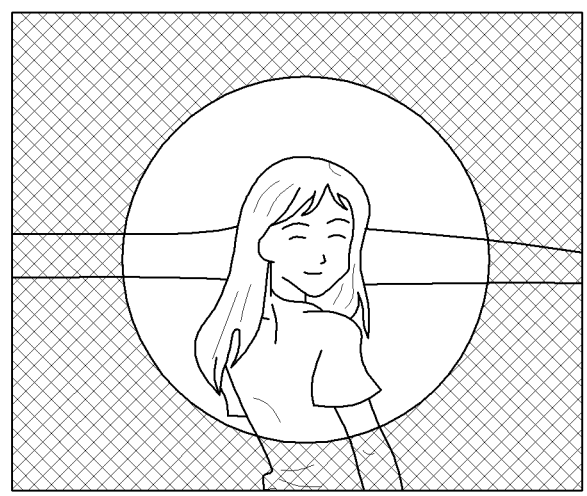
FIG. 16 is an example diagram illustrating a result of resolution smooth transition of a light field display with non-uniform resolution according to an example embodiment.

In order to avoid or prevent uncomfortableness in a visual sense for a user caused by an abnormal resolution, smooth transition can be utilized. As shown in FIG. 15, at a common boundary of a high-resolution area and a low-resolution area, a resolution close to low-resolution may be adopted in advance to generate image contents in the high-resolution field, that is, parameters corresponding to a low-resolution image may be adopted to draw a pixel, and the closer the resolution is toward a high-resolution field center, the higher the resolution becomes. An example result of utilization of smooth transition resolution of an image is shown in FIG. 16.

According to an example embodiment, an HMD apparatus with uniform resolution may include at least one from among a 2D display panel with uniform resolution, a micro lens array with uniformly distributed dot pitch, and eye lenses.

The location arrangement and structure of the 2D display panel, the micro lens array, and the eye lenses may be identical with those shown in FIG. 1 and FIG. 11. The HMD apparatus can further include a light screen, a distance adjustment unit between eye lenses (a first distance adjustment unit), and a distance adjustment unit between an eye lens and a light modulator (a second distance adjustment unit).

According to the example embodiment, the HMD apparatus may include a locating unit, configured to determine a relative location of a pupil of human eyes relative to the HMD apparatus, to locate a pupil of human eyes in a main view area by adjusting a location of the main view area. For example, the locating unit can be a camera that is arranged around an eye lens within the HMD apparatus, and can capture an image in an eye. The location of the pupil relative to the camera may be obtained by detecting location of the pupil from the image, and then the location of the pupil relative to the HMD apparatus may be obtained according to the known location of the camera relative to the HMD apparatus. Based on the location of the pupil relative to the HMD apparatus, generated parameters of the main view area may be controlled, so the main view area can include a pupil of human eyes.

According to an example embodiment, an HMD apparatus with non-uniform resolution may include at least one from among a 2D display panel with non-uniform resolution, a micro lens array with non-uniformly distributed dot pitch, and eye lenses.

The HMD apparatus may further include a light screen, a distance adjustment unit between eye lenses, and a distance adjustment unit between an eye lens and a light modulator.

According to an example embodiment, the HMD apparatus may further include a locating unit, configured to determine a relative location of a pupil of human eyes relative to the HMD apparatus, to locate a pupil of human eyes in the main view area by adjusting a location of the main view area. For example, the locating unit can be a camera that arranged around eye lens within the HMD apparatus, and can capture an image in an eye. The location of the pupil relative to the camera may be obtained by detecting location of the pupil from the image, and then the location of the pupil relative to the HMD apparatus may be obtained according to the known location of the camera relative to the HMD apparatus. Based on the location of the pupil relative to the HMD apparatus, generating parameters of the main view area may be controlled, so the main view area can include a pupil of human eyes.

It can be understood for those skilled in the art that each block of the structure charts and/or block diagrams and/or flowchart illustrations, and combinations of blocks in the structure charts and/or block diagrams and/or flowchart illustrations, can be implemented by computer program instructions. It can be understood for those skilled in the art that the computer program instructions may also be supplied to a general purpose computer, a special purpose computer or other processor capable of programming data processing method for implementation, such that schemes specified in one or more block of the structure charts and/or block diagrams and/or flowchart illustrations are implemented by a computer or other processor capable of programming data processing method.

It can be understood for those or ordinary skilled in the art that various operations, methods, steps, measures, and schemes that have been discussed in the present disclosure may be alternated, changed, combined or deleted. In addition, those with various operations, methods, steps, measures, and schemes that have been discussed in the disclosure invention may further be alternated, changed, rearranged, disintegrated, combined or deleted.

While example embodiments have been described with reference to the drawings, it will be understood by those of ordinary skill in the art that various changes in form and details may be made therein without departing from the spirit and scope as defined by the following claims and their equivalents.

What is claimed is:

1. A head-mounted display (HMD) apparatus comprising:
a light modulator configured to perform integral imaging on an image output from a two-dimensional (2D) display panel to form a light field image;
an eye lens configured to magnify the light field image formed by the light modulator; and
an aperture disposed between the light modulator and the eye lens and configured to filter light rays from at least one view area except a main view area.

2. The HMD apparatus of claim 1, further comprising:
a light screen configured to project a first light field image associated with a left eye to the left eye and not to a right eye, and project a second light field image associated with to the right eye to the right eye and not to the left eye,
wherein the light screen is provided between the light modulator and the eye lens.

3. The HMD apparatus of claim 1, further comprising:
at least one processor configured to:
acquire parameter information of the HMD apparatus; and
generate, based on the parameter information acquired, three-dimensional (3D) image information of the HMD apparatus.

4. The HMD apparatus of claim 1, further comprising:
at least one processor configured to:
adjust a distance between an eye lens corresponding to a left eye and an eye lens corresponding to a right eye on the HMD apparatus, to correspond to a distance between a pupil of the left eye and a pupil of the right eye of a user;
adjust distance between one of the eye lens corresponding to the left eye and the right eye and the light modulator on the HMD apparatus, to correspond to an eyesight of the user;
a camera configured to determine a location of the pupil of the left eye and the pupil of the right eye of the user with respect to the HMD apparatus, wherein the location of the pupil of the left eye and the pupil of the right eye of the user are included within the main view area by adjusting a location of the main view area; and
a storage configured to store an error value corresponding to a-parameter information of the HMD apparatus.

5. The HMD apparatus of claim 1, further comprising:
the 2D display panel configured to output an image,
wherein the light modulator is configured with uniformly distributed dot pitch based on the 2D display panel configured with uniform resolution, and
wherein the light modulator is configured with non-uniformly distributed dot pitch based on the 2D display panel configured with non-uniform resolution.

6. The HMD apparatus of claim 1, wherein the light modulator is a micro lens array or a pinhole array.

7. The HMD apparatus of claim 3, wherein the at least one processor is further configured to:
determine the parameter information of the HMD apparatus based on first parameters preset by the HMD apparatus, and
acquire the determined parameter information of the HMD apparatus.

8. The HMD apparatus of claim 7, wherein the at least one processor is further configured to determine the parameter information of the HMD apparatus based on third parameters calibrated based on second parameters computed from the first parameters and error values corresponding to the second parameters.

9. The HMD apparatus of claim 7, wherein the first parameters comprise at least one from among:
a distance between the 2D display panel and the eye lens,
a distance between a virtual 2D display panel and the eye lens,
a diameter of the eye lens,
a width of the virtual 2D display panel,
a number of pixels corresponding to the eye lens, and
a pixel pitch of the 2D display panel.

10. The HMD apparatus of claim 3, wherein the parameter information of the HMD apparatus comprises at least one from among:
a magnification factor of the 2D display panel,
a focal distance of the eye lens,
a dot pitch of a virtual light modulator,
a distance between the eye lens and a vertex of the main view area,
a view angle of the main view area,
a distance between a virtual 2D display panel and the virtual light modulator,
a distance between the light modulator and the eye lens,
a distance between the light modulator and the 2D display panel,
a magnification factor of the light modulator, and
a dot pitch of the light modulator.

11. A method for generating three-dimensional (3D) image information by a head-mounted display (HMD) apparatus, the method comprising:
acquiring parameter information of the HMD apparatus based on first parameters preset by the HMD apparatus;
generating, according to the parameter information acquired, 3D image information of the HMD apparatus;
performing integral imaging on an image output from a two-dimensional (2D) display panel to form a light field image by a light modulator included in the HMD apparatus;
filtering light rays from at least one view area except a main view area by an aperture included in the HMD apparatus, the aperture being disposed between the light modulator and an eye lens included in the HMD apparatus; and
magnifying the light field image formed by the light modulator by the eye lens.

12. The method of claim 11, further comprising:
projecting a first light field image associated with a left eye to the left eye and not to a right eye, and projecting a second light field image associated with the right eye to the right eye and not to the left eye by a light screen included in the HMD apparatus,
wherein the light screen is provided between the light modulator and the eye lens.

13. The method of claim 11, further comprising:
adjusting a distance between an eye lens corresponding to a left eye and an eye lens corresponding to a right eye on the HMD apparatus to correspond to a distance between a pupil of the left eye and a pupil of the right eye of a user;
adjusting a distance between one of the eye lens corresponding to the left eye and the right eye and the light modulator included in the HMD apparatus to correspond to an eyesight of the user;
determining a location of the pupil of the left eye and the pupil of the right eye of the user with respect to the HMD apparatus, wherein the location of the pupil of the left eye and the pupil of the right eye of the user are included within the main view area by adjusting a location of the main view area; and storing an error value corresponding to the parameter information of the HMD apparatus.

14. The method of claim 11, further comprising:
outputting an image by the 2D display panel,
wherein the light modulator is configured with uniformly distributed dot pitch based on the 2D display panel configured with uniform resolution, and
wherein the light modulator is configured with non-uniformly distributed dot pitch based on the 2D display panel configured with non-uniform resolution.

15. The method of claim 11, wherein the light modulator is a micro lens array or a pinhole array.

16. The method of claim 11, wherein the acquiring parameter information of the HMD apparatus comprises:
determining the parameter information of the HMD apparatus based on the first parameters preset by the HMD apparatus; and
acquiring the determined parameter information of the HMD apparatus.

17. The method of claim 11, wherein the first parameters comprises at least one from among a distance between the 2D display panel and the eye lens, a distance between a virtual 2D display panel and the eye lens, a diameter of the eye lens, a width of the virtual 2D display panel, a number of pixels covered by the eye lens, and a pixel pitch of the 2D display panel.

18. The method of claim 11, wherein the parameter information of the HMD apparatus comprises at least one from among a magnification factor of the 2D display panel, a focal distance of the eye lens, a dot pitch of a virtual light modulator, a distance between the eye lens and a vertex of the main view area, a view angle of the main view area, a distance between a virtual 2D display panel and a virtual light modulator, distance between the light modulator and the eye lens, a distance between the light modulator and the 2D display panel, a magnification of the light modulator, and a dot pitch of the light modulator.

* * * * *